(12) United States Patent
Kubota et al.

(10) Patent No.: US 7,929,957 B2
(45) Date of Patent: Apr. 19, 2011

(54) MOBILE PHONE AND FORWARDING PROGRAM STORAGE MEDIUM

(75) Inventors: Yuji Kubota, Kawasaki (JP); Masami Musha, Kawasaki (JP); Junichi Joho, Kawasaki (JP); Yusuke Takahashi, Kawasaki (JP); Hitoshi Yokomaku, Kawasaki (JP); Takanori Ito, Kawasaki (JP); Fuminori Yahagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 716 days.

(21) Appl. No.: 11/905,371

(22) Filed: Sep. 28, 2007

(65) Prior Publication Data

US 2008/0032689 A1   Feb. 7, 2008

Related U.S. Application Data

(63) Continuation of application No. PCT/JP2005/006094, filed on Mar. 30, 2005.

(51) Int. Cl.
H04M 3/42 (2006.01)

(52) U.S. Cl. ............... 455/417; 455/414.1; 455/445

(58) Field of Classification Search ............. 455/425, 455/414.1, 413, 417, 418, 445, 550.1, 552.1, 455/517, 41.2, 67.11, 422.1, 426.1, 567; 379/211.01, 213, 157, 158; 370/259, 271
See application file for complete search history.

(56) References Cited

U.S. PATENT DOCUMENTS

| 7,383,052 | B2 * | 6/2008 | Moton et al. | 455/456.2 |
| 2003/0218570 | A1 | 11/2003 | Moore | |
| 2004/0170267 | A1 * | 9/2004 | Seligmann | 379/211.01 |
| 2004/0185839 | A1 * | 9/2004 | Seligmann et al. | 455/417 |

FOREIGN PATENT DOCUMENTS

| JP | 7-284154 | 10/1995 |
| JP | H09-261738 | 10/1997 |
| JP | 2000-349911 | 12/2000 |
| JP | 03/049326 | 6/2001 |
| JP | 2001-245357 | 9/2001 |
| JP | 2001-298776 | 10/2001 |
| JP | 2003-009232 | 1/2003 |
| JP | 2003-153343 | 5/2003 |
| JP | 2004-040775 | 2/2004 |
| JP | 2005-20574 | 1/2005 |
| JP | 2005-51530 | 2/2005 |

OTHER PUBLICATIONS

International Preliminary Report on Patentability issued in corresponding International Patent Application No. PCT/JP2005/006094, mailed on Nov. 29, 2007. English language version of the International Search Report (PCT/ISA/210) of the International Application No. PCT/JP2005/006094 (mailed on Jul. 5, 2005).
"Japanese Office Action", mailed by JPO and corresponding to Japanese application No. 2007-510288 on Aug. 17, 2010, with English translation.
Japan Patent Office; Office Action mailed Jan. 11, 2011, in connection with counterpart JP application No. 2007-510288; English-language translation provided.

* cited by examiner

Primary Examiner — Jean A Gelin
(74) Attorney, Agent, or Firm — Fujitsu Patent Center

(57) ABSTRACT

A mobile phone has: a close-range communication control section that performs close-range wireless communication with other mobile phones; a forwarding destination storage section that stores a forwarding destination list in which phone numbers of telephones capable of accepting forwarding are recorded; and a close-range wireless communication monitoring section that causes the close-range wireless communication section to perform close-range wireless communication and monitors establishment of close-range wireless communication with a forwarding acceptance telephone having a phone number that matches any of the phone numbers in the forwarding destination list. The mobile phone also has an incoming call forwarding destination notification section that notifies the phone number of a forwarding acceptance telephone, with which close-range wireless communication by the close-range wireless communication section has been established, to the call forwarding service center as a forwarding destination phone number.

4 Claims, 15 Drawing Sheets

GROUP INFROMATION:

| GROUP ID | FORWARDING DESTINATION TERMINAL PHONE NUMBER |
|---|---|
| ID1 | AAA-AAAA-AAAA |
|  | BBB-BBBB-BBBB |
|  | ⋮ |
|  | CCC-CCCC-CCCC |
| ID2 | DDD-DDDD-DDDD |
|  | ⋮ |

Fig. 6

INCOMING CALL FORWARDING INFORMATION:

| GROUP ID | CALLING TERMINAL PHONE NUMBER | APPLICABLE RANGE |
|---|---|---|
| ID1 | EEE-EEEE-EEEE | INDEPENDENT |
|  | FFF-FFFF-FFFF |  |
| ID2 | GGG-GGGG-GGGG | WITHIN PHONEBOOK GROUP |
|  | ⋮ |  |

Fig. 7

| STATE OF OWN TERMINAL / STATE OF COMMUNICATION PARTNER TERMINAL | POSITION IMMEASURABLE | STATIONARY LEVEL | IN-MOVEMENT LEVEL |
|---|---|---|---|
| POSITION IMMEASURABLE | DETERMINE SOLELY BASED ON COMMUNICATION STATUS | REGISTRATION OBJECT | NOT REGISTRATION OBJECT |
| STATIONARY LEVEL | REGISTRATION OBJECT | REGISTRATION OBJECT | NOT REGISTRATION OBJECT |
| IN-MOVEMENT LEVEL | NOT REGISTRATION OBJECT | NOT REGISTRATION OBJECT | NOT REGISTRATION OBJECT |

Fig. 16

MOBILE PHONE AND FORWARDING PROGRAM STORAGE MEDIUM

CROSS REFERENCE TO RELATED APPLICATION

This application is a continuing application, filed under 35 U.S.C. §111(a), of International Application PCT/JP2005/006094, filed Mar. 30, 2005, the entire contents of which are incorporated herein by reference.

TECHNICAL FIELD

The present invention relates to a mobile phone that receives a forwarding service performed by a call forwarding service center in which an incoming call, which is made when reception thereof is impossible, is forwarded to a telephone having a forwarding destination phone number, as well as a forwarding program storage medium that stores a forwarding program that is executed within a mobile phone to assign a forwarding function to the mobile phone.

BACKGROUND ART

In recent years, there has been a rapid and expansive growth of mobile phone use. In addition to a communication function, models currently available include those equipped with various functions such as sending and receiving electronic mails and camera functions. Call forwarding services which forward an incoming call to another telephone have been conventionally used. However, a mobile phone may frequently experience interruptions in communication since a mobile phone is carried by a user and is movable to various locations including those where signals are too weak to establish communication, or since the user may choose to switch off the mobile phone to avoid bothering other people. As a result, call forwarding services are becoming more and more important.

To use a call forwarding service, a user must operate his/her mobile phone and register a forwarding destination phone number in advance to a call forwarding service center. The mobile phone must also be operated every time a forwarding destination is changed. Many users may consider this to be burdensome. Accordingly, it is difficult for a user to perform operations in order to change forwarding destinations in response to moment-to-moment circumstances.

With respect to a call forwarding service, in order to enable forwarding even when forwarding is not set at a receiving-side phone or when the receiving-side phone is busy, Patent Document 1 proposes a method in which a wireless base station-side control apparatus manages positional information of respective mobile phones as well as groups to which the respective mobile phones belong, and in the event that a mobile phone is unable to receive an incoming call, the wireless base station-side control apparatus determines a mobile phone that is in the same wireless communication area as the mobile phone and is also in the same group, and forwards the incoming call thereto.

In addition, Patent Document 2 proposes a method in which, in order to deal with situations where a forwarding destination is also incapable of communication, forwarding is performed to another mobile phone or fixed telephone in the same communication area among multiple registered incoming call forwarding destinations in the event that a mobile phone or a fixed telephone is incapable of receiving the incoming call and a pre-registered forwarding destination is also incapable of receiving the incoming call.

Patent Document 1: Japanese Patent Laid-Open No. H7-284154
Patent Document 2: Japanese Patent Laid-Open No. 2001-245357

DISCLOSURE OF THE INVENTION

With the method described in the above Patent Document 1 or 2, forwarding destinations change according to current situations. However, it is conceivable that the method fundamentally estimates that, by performing forwarding to a telephone inside the same communication area, the movement of the user of the telephone that was originally called is likely to be known.

However, considering that a communication area of a single wireless base station may be extensive, the fact that a forwarding destination is within the same communication area does not necessarily mean that a person at the forwarding destination and the original intended recipient has come into contact with each other. Therefore, the probability that the movement of the original intended recipient is known is not particularly high.

In consideration of the circumstances described above, an object of the present invention is to provide a mobile phone and a forwarding program storage medium that stores a forwarding program, which enable a forwarding destination to be changed in a flexible manner to a mobile phone of a person that is likely to know a current movement of the original intended recipient.

In order to achieve the above object, a mobile phone according to the present invention is capable of transmitting and receiving calls via wireless communication, and by pre-registering a forwarding destination phone number to a call forwarding service center, receives a call forwarding service provided by the call forwarding service center in which an incoming call, made when reception thereof was impossible, is forwarded to a telephone having the registered forwarding destination phone number, the mobile phone having:

a wireless communication section that performs wireless communication including transmitting and receiving calls;

a close-range wireless communication section that performs close-range wireless communication with other mobile phones;

a forwarding destination storage section that stores a forwarding destination list in which numbers of one or more telephones capable of accepting forwarding are recorded;

a close-range wireless communication monitoring section that causes the close-range wireless communication section to perform close-range wireless communication and monitors establishment of close-range wireless communication with a forwarding acceptance telephone having a phone number that matches any of the phone numbers in the forwarding destination list stored in the forwarding destination storage section; and a forwarding destination notification section that causes the wireless communication section to notify the phone number of the forwarding acceptance telephone with which close-range wireless communication by the close-range wireless communication section has been established to the call forwarding service center as a forwarding destination phone number.

With the mobile phone according to the present invention, a communication partner with which close-range wireless communication such as communication using a wireless LAN or Bluetooth has been established is automatically registered by performing such close-range wireless communication. In this case, establishment of close-range wireless communication implies that the forwarding destination is extremely near the original intended recipient, and therefore it is likely that the movement of the original intended recipient is known.

Thus, in such cases as an emergency call, it is likely that contents thereof are conveyed to the original intended recipient in a prompt manner.

In addition, according to the present invention, since forwarding destinations are automatically changed in response to current situations, operations for changing forwarding destinations are no longer required, and the burdens placed on users may be significantly reduced.

The mobile phone according to the present invention preferably further includes:

a calling source storage section that stores a calling source list in which phone numbers of one or more calling source telephones are recorded; and a calling source notification section that causes the close-range wireless communication section to notify a calling source phone number in the calling source list to a forwarding acceptance telephone with which close-range wireless communication by the close-range wireless communication section has been established in order to have the forwarding acceptance telephone accept forwarding of an incoming call from a telephone having the calling source phone number.

By notifying a calling source phone number in advance, the forwarding destination may only respond to necessary calls. As a result, the burden placed on the user of the forwarding destination can be reduced.

In addition, the mobile phone according to the present invention preferably further includes: a forwarding destination adequacy judgment section that judges, based on the status of communication with a forwarding acceptance telephone with which close-range wireless communication by the close-range wireless communication section has been established, adequacy of the forwarding acceptance telephone as a forwarding destination, wherein the forwarding destination notification section causes, upon reception of a judgment made by the forwarding destination adequacy judgment section to the effect that the forwarding acceptance telephone with which close-range wireless communication by the close-range wireless communication section has been established is adequate as a forwarding destination, the wireless communication section to notify the phone number of the forwarding acceptance telephone to the call forwarding service center.

Establishment of close-range wireless communication section may include cases where communication is established only momentarily, such as when the parties just happen to pass each other. Therefore, a user of a mobile phone for which close-range wireless communication is continually established over a certain amount of time is more likely to know the movement of the original intended recipient.

In consideration thereof, the mobile phone according to the present invention is provided with the above forwarding destination adequacy judgment section to enable selection and use of an adequate forwarding acceptance telephone as a forwarding destination.

In a configuration provided with the above forwarding destination adequacy judgment section, it is preferable that the mobile phone further includes a position detection section that detects a current position, wherein the forwarding destination adequacy judgment section judges adequacy of the forwarding acceptance telephone, with which close-range wireless communication by the close-range wireless communication section has been established, as a forwarding destination based not only on the status of communication with the forwarding acceptance telephone, but also on changes in positions detected by the position detection section.

Additionally evaluating position information further improves accuracy of judgment on the adequacy as a forwarding destination telephone.

Furthermore, in order to achieve the above object, a forwarding program storage medium according to the present invention is a storage medium that stores a forwarding program executed in a mobile phone which includes: a wireless communication section that performs wireless communication including transmitting and receiving calls; a close-range wireless communication section that performs close-range wireless communication with other mobile phones; and a processing section that executes the program, wherein, by pre-registering a forwarding destination phone number to a call forwarding service center, the mobile phone receives a call forwarding service provided by the call forwarding service center in which an incoming call, made when reception thereof was impossible, is forwarded to a telephone having the registered forwarding destination phone number, and the forwarding program assigning to the mobile phone a forwarding function including:

a forwarding destination storage section that stores a forwarding destination list in which phone numbers of one or more telephones capable of accepting forwarding are recorded;

a close-range wireless communication monitoring section that causes the close-range wireless communication section to perform close-range wireless communication and monitors establishment of close-range wireless communication with a forwarding acceptance telephone having a phone number that matches any of the phone numbers in the forwarding destination list stored in the forwarding destination storage section; and a forwarding destination notification section that causes the wireless communication section to notify the phone number of the forwarding acceptance telephone with which close-range wireless communication by the close-range wireless communication section has been established to the call forwarding service center as a forwarding destination phone number.

According to the present invention described above, forwarding destinations may be changed in a flexible manner to a person that is likely to know a current movement of the original intended recipient without bothering the person.

BRIEF DESCRIPTION OF THE DRAWINGS

FIG. 6 is a diagram showing a data configuration of group information recorded in a group information file.

FIG. 7 is a diagram showing a data configuration of incoming call forwarding information recorded in an incoming call forwarding information file.

FIG. 16 is a diagram showing a correspondence between movement patterns of the own terminal and the communication partner terminal, and adequacy of the communication partner terminal as a forwarding destination terminal.

BEST MODE FOR CARRYING OUT THE INVENTION

Embodiments of the present invention will now be described.

Figure 1:
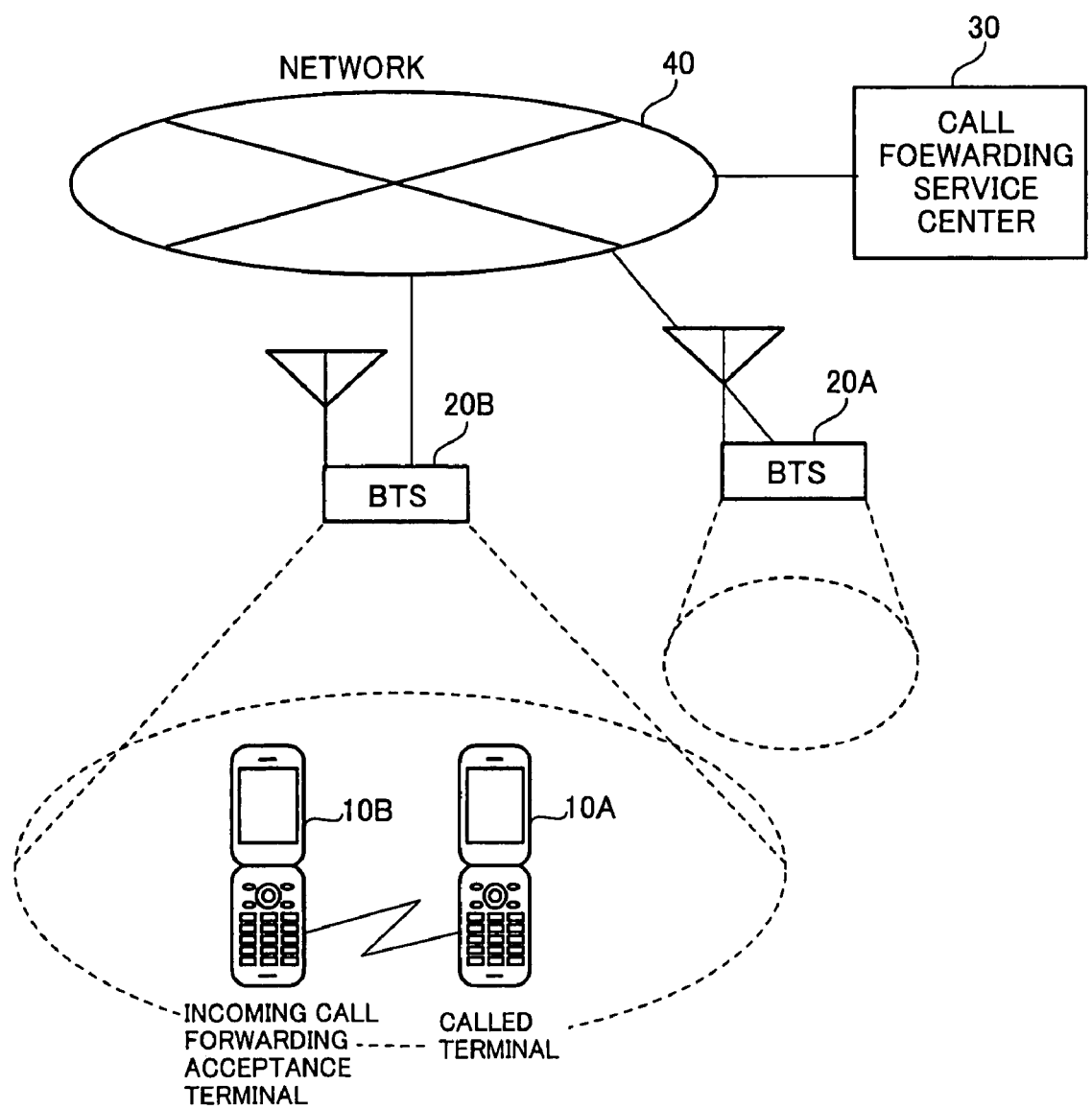
FIG. 1 is an overall configuration diagram including a terminal as an embodiment of a mobile phone according to the present invention.

FIG. 1 is an overall configuration diagram including a mobile terminal as an embodiment of a mobile phone according to the present invention.

FIG. 1 shows a called terminal 10A; an incoming call forwarding acceptance terminal 10B; two wireless base stations (BTSs or base transceiver stations) 20A and 20B; a call forwarding service center 30; and a network 40 that connects the wireless base stations 20A, 20B and the call forwarding service center 30.

The called terminal 10A and the incoming call forwarding acceptance terminal 10B are mobile terminals having the same function with respect to the embodiment described below. However, in this description, according to their respective roles, a mobile terminal that is the original intended recipient of a call made from a terminal, not shown, shall be referred to as the called terminal 10A, and a mobile terminal that becomes a forwarding destination or a forwarding destination candidate of the call made when the called terminal 10A is unable to receive the same shall be referred to as the incoming call forwarding acceptance terminal 10B. While FIG. 1 only shows two mobile terminals (the called terminal 10A and the incoming call forwarding acceptance terminal 10B), in reality, the system has a large number of member terminals.

Hereinafter, in cases where distinguishing between the called terminal 10A and the incoming call forwarding terminal 10B is unnecessary when describing a mobile terminal that is a member of the system, such terminals shall be collectively referred to as the mobile terminal 10.

In addition, while FIG. 1 only shows two wireless base stations 20A and 20B, there are also a large number of wireless base stations. The wireless base stations 20A and 20B are respectively assigned wireless communication areas.

The call forwarding service center 30 provides a service in which: registration of an incoming call forwarding destination phone number (in the shown example, the phone number of the incoming call forwarding acceptance terminal 10B) is accepted, the registered phone number is associated and recorded with the phone number of a terminal of a user using this service (in the shown example, the phone number of the called terminal 10A: in the present description, this phone number shall be referred to as the called phone number); and when the called terminal 10A is unable to answer a call (by moving to a location where radio waves may not be received or by turning off power), the call is forwarded to a terminal (in the shown example, the incoming call forwarding acceptance terminal 10B) having an incoming call forwarding destination phone number associated and recorded with the called phone number.

Figure 2:
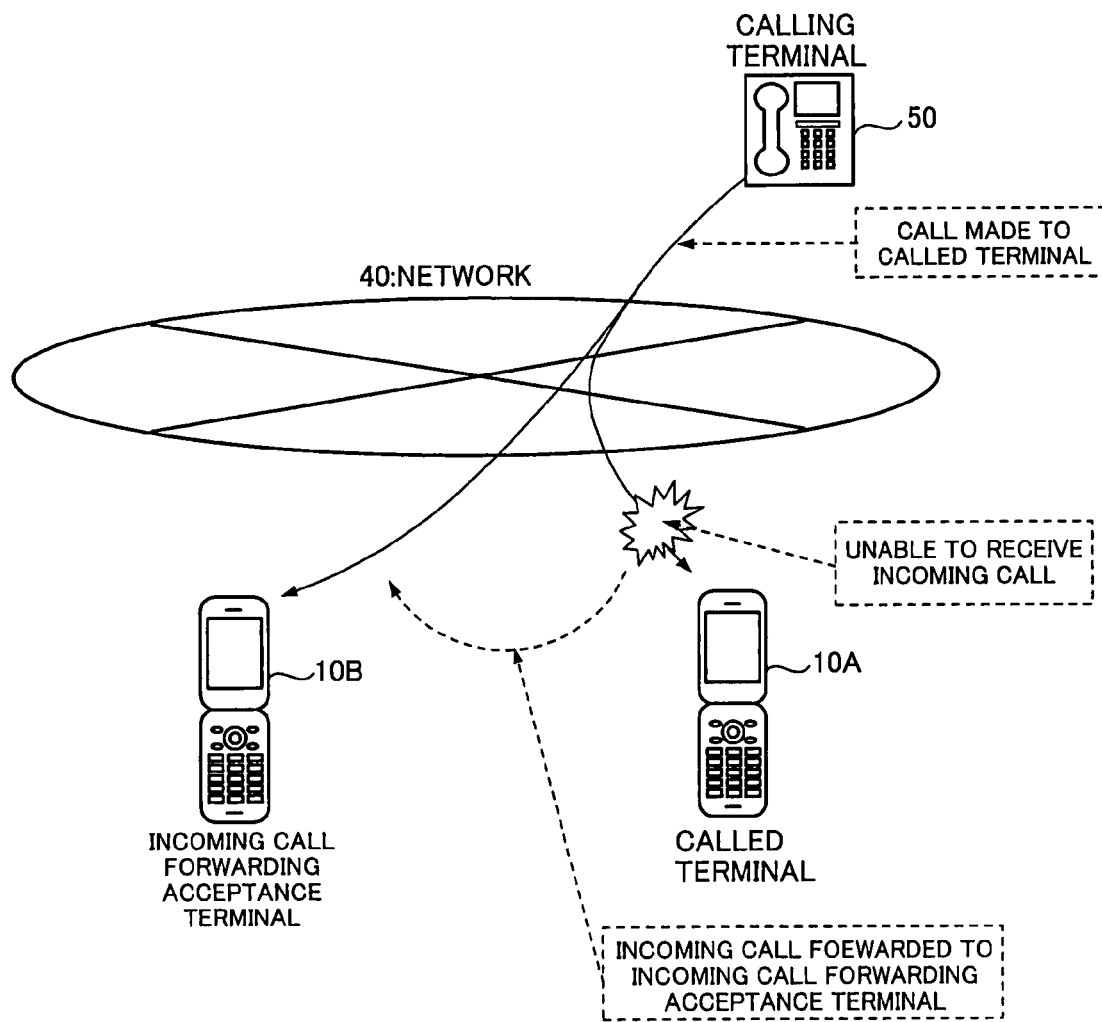
FIG. 2 is an explanatory diagram of forwarding of an incoming call.

FIG. 2 is an explanatory diagram of forwarding of an incoming call.

When a call is made from a calling terminal 50 to the called terminal 10A, in the event that the called terminal 10A is, for instance, in an area where radio waves may not be received and is therefore unable to answer the call, the call is forwarded by the call forwarding service center 30 (refer to FIG. 1) to the incoming call forwarding acceptance terminal 10B.

Figure 3:
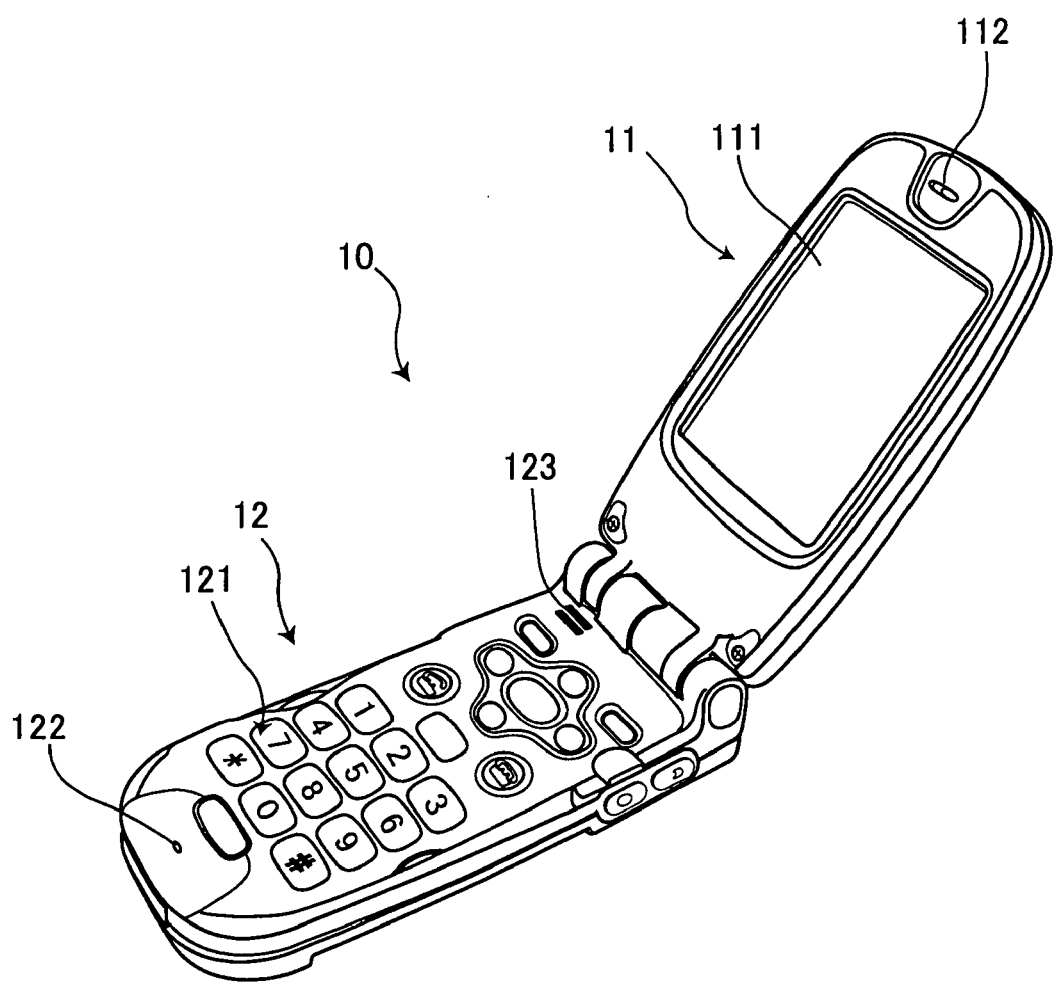
FIG. 3 is an external perspective view of a mobile terminal.

FIG. 3 is an external perspective view of the mobile terminal 10.

While there is a slight difference in the external appearances of the called terminal 10A and the incoming call forwarding acceptance terminal 10B shown in FIGS. 1 and 2, the functions of the terminals are similar. Therefore, in the following description, the terminals will be representatively referred to as the mobile terminal 10.

The mobile terminal 10 consists of an upper chassis 11 and a lower chassis 12 which open and close against each other. The upper chassis 11 is provided with an LCD 111 for displaying images, and an earpiece 112 that is internally provided with a small-size speaker and is pressed against an ear of the user so that the user can hear voices.

In addition, the lower chassis 12 is provided with: various operation keys 121 that are operated by the user to make calls or transmit electronic mails from the mobile terminal 10 and to perform various settings; a mouthpiece 122 provided with a built-in microphone that picks up the voice of the user and guides the voice to the microphone; and a loud speaker 123 provided with a relatively large built-in speaker and which outputs sounds at a volume level that the user can hear the sounds without pressing an ear against the loud speaker 123.

Figure 4:
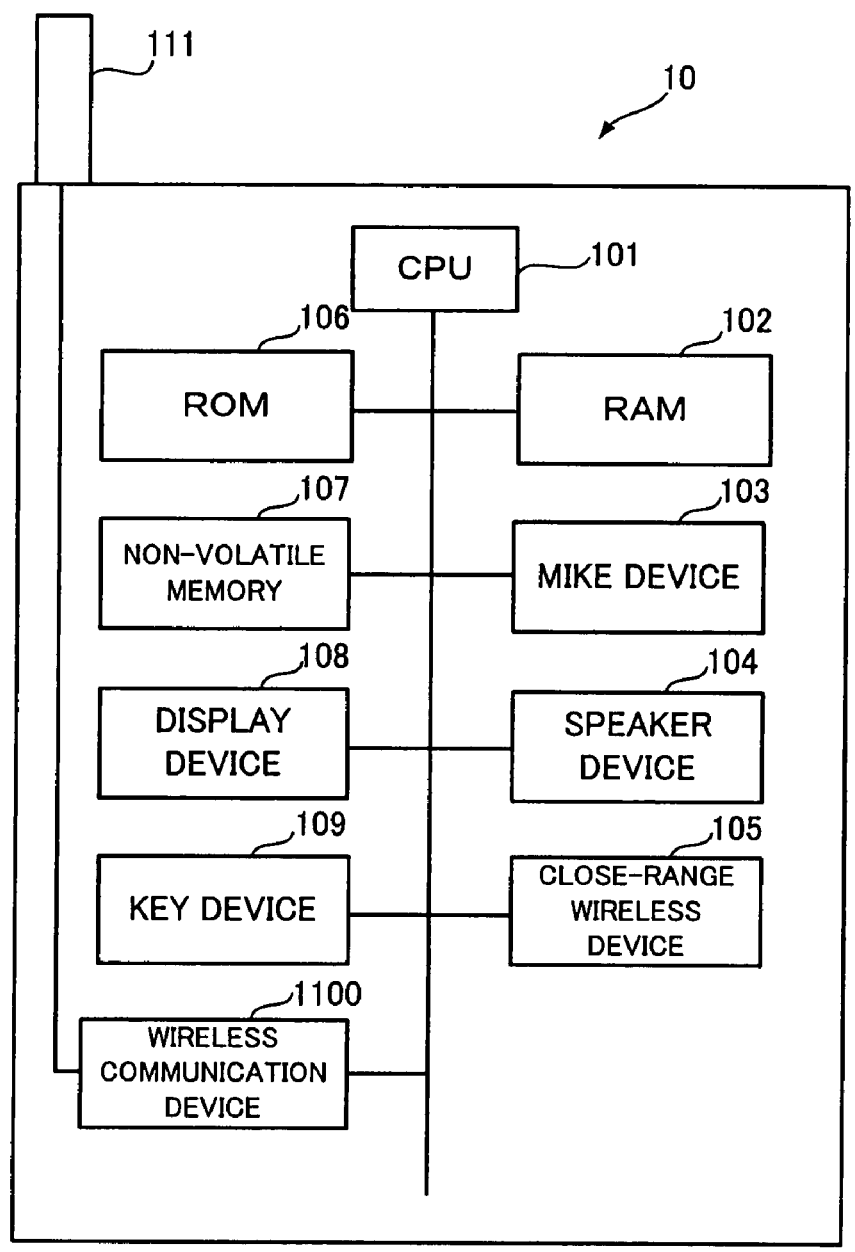
FIG. 4 is an internal configuration diagram of a mobile terminal.

FIG. 4 is an internal configuration diagram of the mobile terminal 10 shown in FIG. 3.

FIG. 4 shows a CPU 101, a RAM 102, a mike device 103, a speaker device 104, a close-range wireless device 105, a ROM 106, a non-volatile memory 107, a display device 107, a key device 109, a wireless communication device 110, and an antenna 111. With the exception of the antenna 111, the components are mutually connected via a.

The CPU 101 is provided with a function for executing various programs, and controls the entire mobile terminal 10.

The ROM 106 stores various programs executed by the CPU 101 and various constants necessary for the execution of the various programs. The CPU 101 executes the programs stored in the ROM 106 while using the RAM 102 as a work area.

The non-volatile memory 107 stores various settings, conditions and the like of the mobile terminal 10 which may be rewritten.

The mike device 103 is a function block which represents the microphone that picks up the voice of the user, and processes voices picked up by the microphone.

The speaker device 104 is a function block which represents the speaker that outputs sounds towards the user, and generates audio signals for driving the speaker.

The close-range wireless device 105 is, in the present embodiment, a device that performs close-range wireless communication compliant to specifications of a wireless LAN (local area network), and is used herein for direct communication with the multiple member mobile terminals of the system which is not performed via the wireless base stations 20A, 20B or the network 40.

In this description, while the devices are described as performing close-range wireless communication compliant to specifications of a wireless LAN, other close-range wireless communication means such as Bluetooth or infrared communication may be adopted.

The display device 108 is a block responsible for performing image display on the LCD 111 shown in FIG. 3, while the key device 109 is a block that detects key operations performed by the user on the various operation keys 121 (refer to FIG. 3).

In addition, the wireless communication device 110 is responsible for making and receiving calls, sending and receiving electronic mails or the like by performing wireless communication with wireless base stations using the antenna 111.

Figure 5:
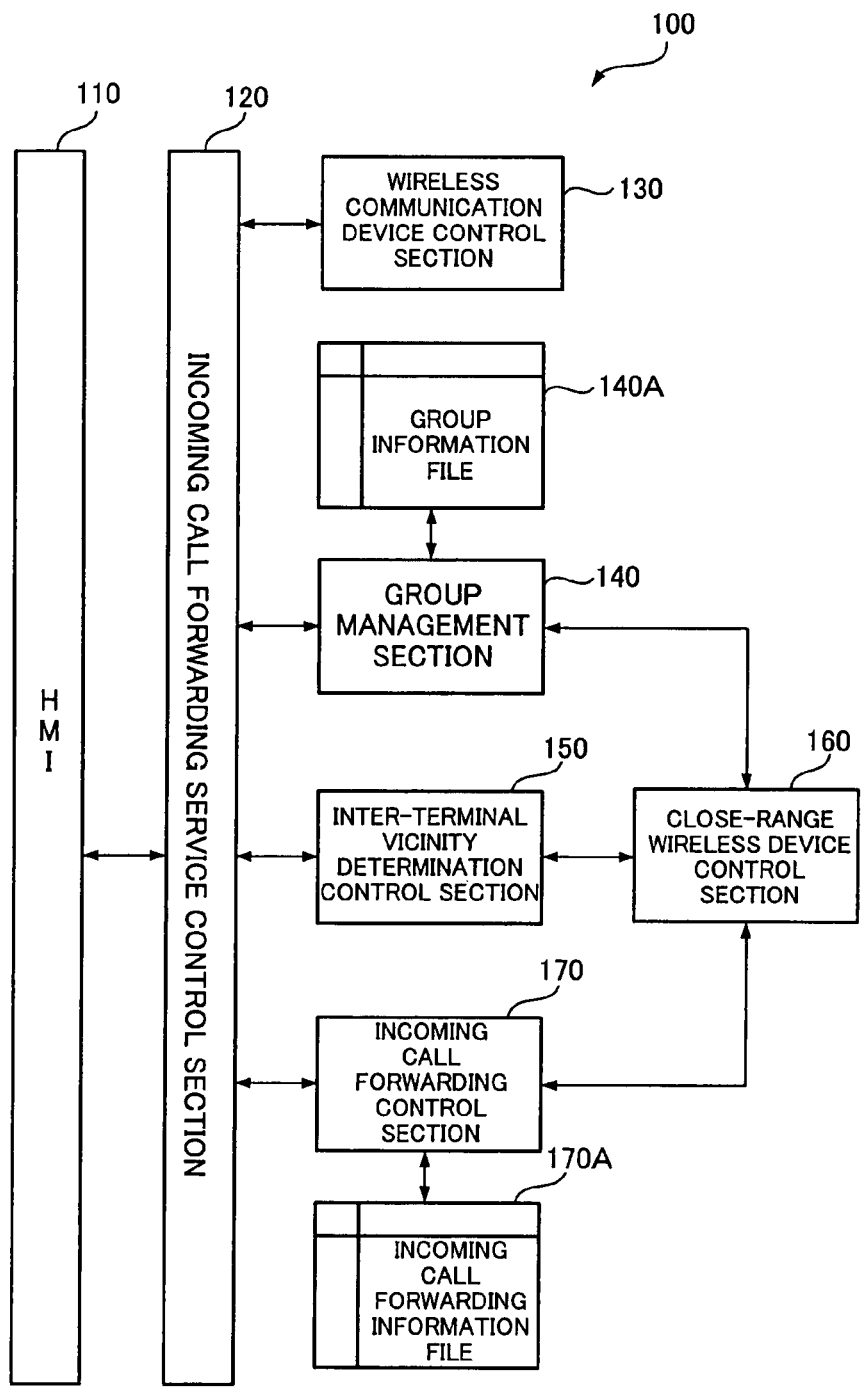
FIG. 5 is a diagram showing a structure of a forwarding program executed by a mobile terminal.

FIG. 5 is a diagram showing a structure of a forwarding program executed by the CPU 101 (refer to FIG. 4) of the mobile terminal 10 shown in FIGS. 3 and 4.

The mobile terminal 10 operates as the called terminal 10A shown in FIGS. 1 and 2 when the CPU 101 of the mobile terminal 10 executes the forwarding program shown in FIG. 5.

An incoming call forwarding program 100 shown in FIG. 5 is composed of: an HMI (human machine interface) 110; an incoming call forwarding service control section 120; a wireless communication device control section 130; a group management section 140; an inter-terminal vicinity determination control section 150; a close-range wireless device control section 160; and an incoming call forwarding control section 170.

FIG. 5 also shows a block of group information files 140A that is referenced by the group management section 140, and a block of incoming call forwarding information files 170A that is referenced by the incoming call forwarding control section 170. The group information files 140A and the incoming call forwarding information files 170A are stored in the non-volatile memory 107 shown in FIG. 4.

FIG. 6 is a diagram showing a data configuration of group information recorded in the group information files 140A that is shown as a single block in FIG. 5.

"Group IDs" and "forwarding destination terminal phone numbers" associated with the group IDs are recorded in the information.

In the group information, a "forwarding destination terminal phone number" refers to a phone number of a forwarding destination terminal that is planned to become an incoming call forwarding destination of a call made to the mobile terminal. Normally, a phone number is entered into the group information file after talking to the user of a mobile terminal as a forwarding destination terminal and gaining consent from the user to use the mobile terminal as a forwarding destination terminal.

FIG. 7 is a diagram showing a data configuration of incoming call forwarding information recorded in the incoming call forwarding information files 170A that are shown as a single block in FIG. 5.

In the same manner as in the group information shown in FIG. 6, FIG. 7 shows group IDs as well as phone numbers and applicable ranges of calling terminals which are associated with the group IDs.

In FIG. 7, a "calling terminal phone number" refers to a phone number of a calling terminal which makes calls to the mobile terminal. The phone numbers of a calling terminal is transmitted by close-range wireless communication to a mobile terminal that becomes a forwarding destination (the incoming call forwarding acceptance terminal 10B: refer to FIGS. 1 and 2). As a result, selections may be made by the mobile terminal that becomes a forwarding destination so that, among forwarded incoming calls, the mobile terminal only receives incoming calls forwarded from a terminal having a phone number that is received in advance as a "calling terminal phone number".

In addition, two different "applicable ranges" are shown in FIG. 7, namely, "independent" and "within phonebook group". "Independent" means that the mobile terminal that becomes a forwarding destination (the incoming call forwarding acceptance terminal 10B) is requested to receive only incoming calls forwarded from a calling terminal having a phone number that is recorded in the incoming call forwarding information as a calling terminal phone number. "Within phonebook group" means that the incoming call forwarding acceptance terminal 10B is requested to receive incoming calls forwarded from a calling terminal of any of the phone numbers registered in the same group as a phone number that is recorded as a calling terminal phone number in the incoming call forwarding information shown in FIG. 7, in a phonebook set within the incoming call forwarding acceptance terminal 10B.

The group IDs in the group information shown in FIG. 6 and the group IDs in the incoming call forwarding information shown in FIG. 7 are mutually linked. The processing described above is enabled only within the same group.

In other words, with respect to the group information shown in FIG. 6 and the incoming call information shown in FIG. 7, when a mobile terminal having a phone number of AAA-AAAA-AAAA shown in FIG. 6 which belongs to a group having a group ID of ID1 becomes an incoming call forwarding acceptance terminal, the incoming call forwarding acceptance terminal receives forwarded incoming calls when either the terminal having a phone number of EEE-EEEE-EEEE or the terminal having a phone number of FFF-FFFF-FFFF, which belong to the same group having a group ID of ID1 shown in FIG. 7, becomes the calling terminal. Meanwhile, when a mobile terminal having a phone number of DDD-DDDD-DDDD shown in FIG. 6 which belongs to a group having a group ID of ID2 becomes an incoming call forwarding acceptance terminal, the incoming call forwarding acceptance terminal receives forwarded incoming calls when a terminal having a phone number of GGG-GGGG-GGGG, which belongs to the same group having a group ID of ID2 shown in FIG. 7, becomes the calling terminal, and when a terminal having any of the phone numbers registered in the same group as the phone number GGG-GGGG-GGGG in the phonebook in the incoming call forwarding acceptance terminal becomes the calling terminal.

Returning now to FIG. 5, the present description will be continued below.

The HMI 110 shown in FIG. 5 is an interface connecting the user of the mobile terminal and the mobile terminal itself, and is responsible for performing detection on whether the various keys 121 shown in FIG. 3 have been operated, and image display on the LCD 111 or the like.

The incoming call forwarding service control section 120 is responsible for control of various sequences or data exchange required to perform the incoming call forwarding service. Details will be described later.

The wireless communication device control section 130 is a block that controls the wireless communication device 110 shown in FIG. 4 to perform via the antenna 111 or wireless base stations and the like various wireless communications such as making/receiving calls or sending/receiving electronic mails.

In addition, the close-distance wireless device control section 160 is a block that controls the close-distance wireless device 105 shown in FIG. 4 to perform close-distance wireless communication with another communication partner terminal that is within close range.

The group management section 140 manages the group information file 140A. More specifically, the group management section 140 enters group information inputted from the HMI 110 via the incoming call forwarding service control section 120 into the group information file 140A, receives a group ID and a phone number acquired through close-range communication from the close-distance wireless device control section 160, checks whether the same group ID and the same phone number is registered in the group information file 140A, and reports to the incoming call forwarding service control section 120. Upon receiving from the group management section 140 a report to the extent that the group ID and phone number of a communication partner terminal to which close-range wireless communication is currently established are the same as the group ID and phone number recorded in the group information file 140A, the incoming call forwarding service control section 120 inquires the inter-terminal vicinity determination control section 150 whether it is adequate to use the communication partner terminal as an incoming call forwarding destination terminal, and instructs the incoming call forwarding control section 170 to read out and send a "calling terminal phone number" and "applicable range" associated with the same group ID as that of the communication partner terminal to the close-distance wireless device control section 160.

Upon receiving the instruction from the incoming call forwarding service control section 120, the inter-terminal vicinity determination control section 150 monitors the communication status of the close-range wireless communication with the communication partner terminal via the close-range wireless control device 160, judges whether the communication partner terminal satisfies a predetermined condition (to be described later) used for judging adequacy as an incoming call forwarding destination terminal, and reports to the incoming call forwarding service control section 120.

In addition, upon receiving the instruction from the incoming call forwarding service control section 120, the incoming call forwarding control section 170 reads out a recorded "calling terminal phone number" and "applicable range" that are associated with the same group ID as that of the communication partner terminal of the current close-range wireless communication from the incoming call forwarding information file 170A and provides the "calling terminal phone number" and "applicable range" to the close-range wireless device control section 160. The close-range wireless device control section 160 transmits the "calling terminal phone number" and "applicable range" received from the incoming call forwarding control section 170 to the current communication partner terminal through close-range wireless communication.

Furthermore, upon receiving from the inter-terminal vicinity determination control section 150 a judgment to the extent that the communication partner terminal that is currently in close-range wireless communication with the close-range wireless device control section 160 is adequate as an incoming call forwarding destination terminal, the incoming call forwarding service control section 120 instructs the incoming call forwarding control section 170 to register the phone number of the communication partner terminal to the call forwarding service center 30 (refer to FIG. 1).

Upon receiving the request, the incoming call forwarding control section 170 receives the phone number of the communication partner from the close-range wireless device control section 160, and requests the wireless device control section 130 via the incoming call forwarding service control section 120 to transmit the phone number of the communication partner terminal to the call forwarding service center 30. Upon receiving the request, the wireless device control section 130 transmits the phone number to the call forwarding service center 30. From this point onward, the communication partner terminal becomes a forwarding destination terminal of calls made to the mobile terminal when the mobile terminal is unable to receive incoming calls.

In addition, after a lapse of a predetermined period of time from the point of registration of the forwarding destination phone number to the call forwarding service center, the incoming call forwarding control section 170 gives a deactivation instruction for deactivating the forwarding service to the wireless communication device control section 130 via the incoming call forwarding service control section 120. The wireless communication device control section 130 transmits the deactivation instruction to the call forwarding service center 30. From this point onward, forwarding of calls made to the mobile terminal will not be performed even when the mobile terminal is unable to receive incoming calls.

After a lapse of a predetermined period of time from the point of registration of the phone number of the communication partner terminal, with which close-range wireless communication is established, as a forwarding destination phone number to the call forwarding service center 30, a phone number registered in advance, such as the home phone number of the user of the mobile terminal, may be reset as a new forwarding destination.

Figure 8:
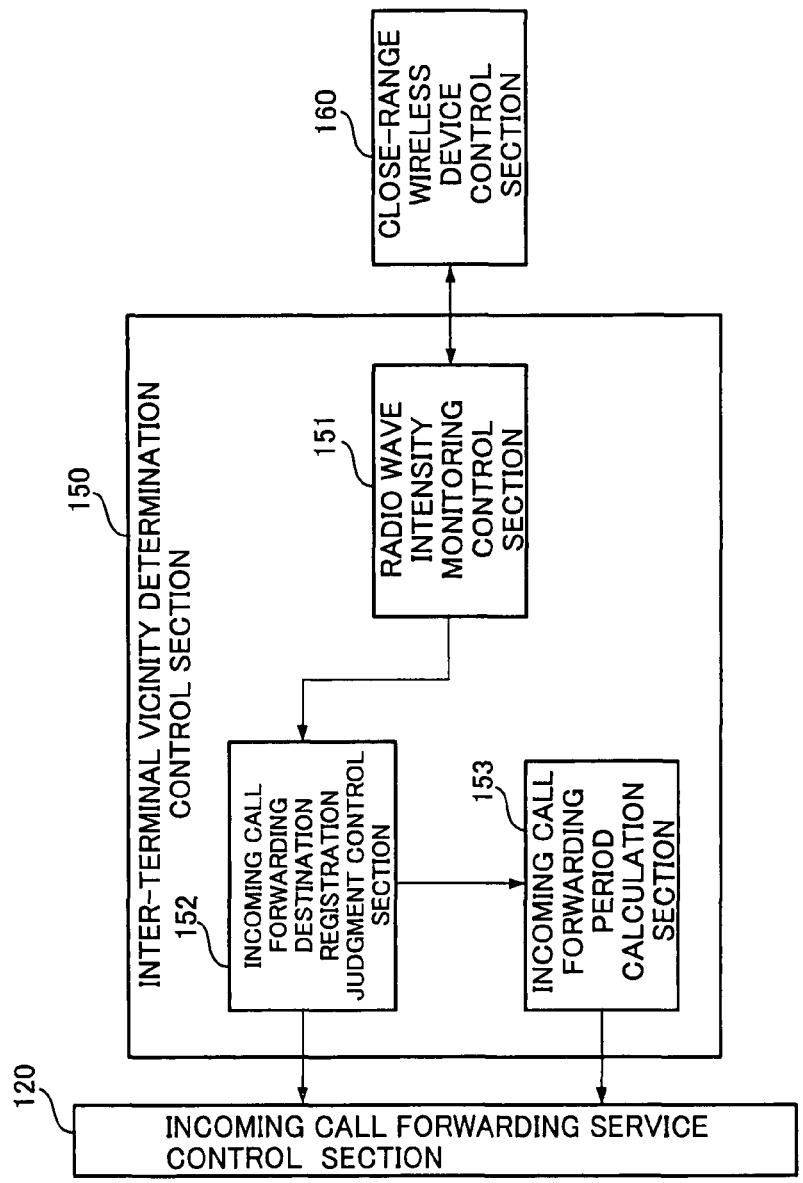
FIG. 8 is a block diagram showing a configuration of an inter-terminal vicinity determination control section.

FIG. 8 is a block diagram showing a configuration of the inter-terminal vicinity determination control section 150 which is shown as a single block in FIG. 5. FIG. 8 also shows the close-range wireless device control section 160 and the incoming call forwarding service control section 120 shown in FIG. 5.

The inter-terminal vicinity determination control section 150 is composed of: a radio wave intensity monitoring control section 151; an incoming call forwarding destination registration judgment control section 152; and an incoming call forwarding period calculation section 153.

The radio wave intensity monitoring control section 151 monitors an intensity status of radio waves of the close-range wireless communication performed by the close-range wireless device control section 160 between the communication partner terminal with which close-range wireless communication is currently established, and also monitors a state of interruption where communication has been broken.

The incoming call forwarding destination registration judgment control section 152 receives a result of monitoring by the radio wave intensity monitoring control section 151, and judges whether the current communication partner terminal is adequate for registration with the call forwarding service center 30 (refer to FIG. 1) as an incoming call forwarding destination.

In this case, the communication partner terminal is judged to be adequate as an incoming call forwarding destination when, for instance, close-range wireless communication is continued for 10 minutes or more at a sufficiently strong radio wave status without an occurrence of an interruption state, or when the radio wave is weak, weighting by radio wave intensity is performed and accumulated with respect to communication time, and an cumulative value exceeds a predetermined value.

When it is judged that the current communication partner terminal is adequate as an incoming call forwarding destination, the judgment result is forwarded to the incoming call forwarding period calculation section 153, as well as to the incoming call forwarding control section 170 via the incoming call forwarding service control section 120.

Even after receiving the judgment result to the extent that the current communication partner terminal is adequate as an incoming call forwarding destination, the incoming call forwarding period calculation section 153 continuously receives either a duration time of communication with the communication partner terminal or a cumulative value of weighting by radio wave intensity subsequent to receiving the judgment result, and calculates a period for which incoming call forwarding should be performed by executing processing such as multiplication of a duration of wireless communication performed between the communication partner terminal by a predetermined value (for instance, duration of wireless communication multiplied by 6) or multiplication of a cumulative value by a predetermined value. The calculated duration is forwarded to the incoming call forwarding control section 170 via the incoming call forwarding service control section 120.

Upon receiving the judgment result to the extent that the communication partner terminal is adequate as an incoming call forwarding destination from the incoming call forwarding destination registration judgment control section 152, the incoming call forwarding control section 170 requests the wireless communication device control section 130 (refer to FIG. 5) via the incoming call forwarding service control section 120 to register the phone number of the communication partner terminal to the call forwarding service center 30 (refer to FIG. 1), and causes the wireless communication device control section 130 to transmit the phone number to the call forwarding service center 30. The incoming call forwarding control section 170 also monitors an arrival of a period for which incoming call forwarding should be performed and which was received from the incoming call forwarding period calculation section 153, and upon expiration of the period, requests the wireless communication device control section 130 via the incoming call forwarding service control section 120 to transmit a deactivation instruction of incoming call forwarding, and thereby causes the deactivation instruction to be transmitted to the call forwarding service center 30.

Figure 9:
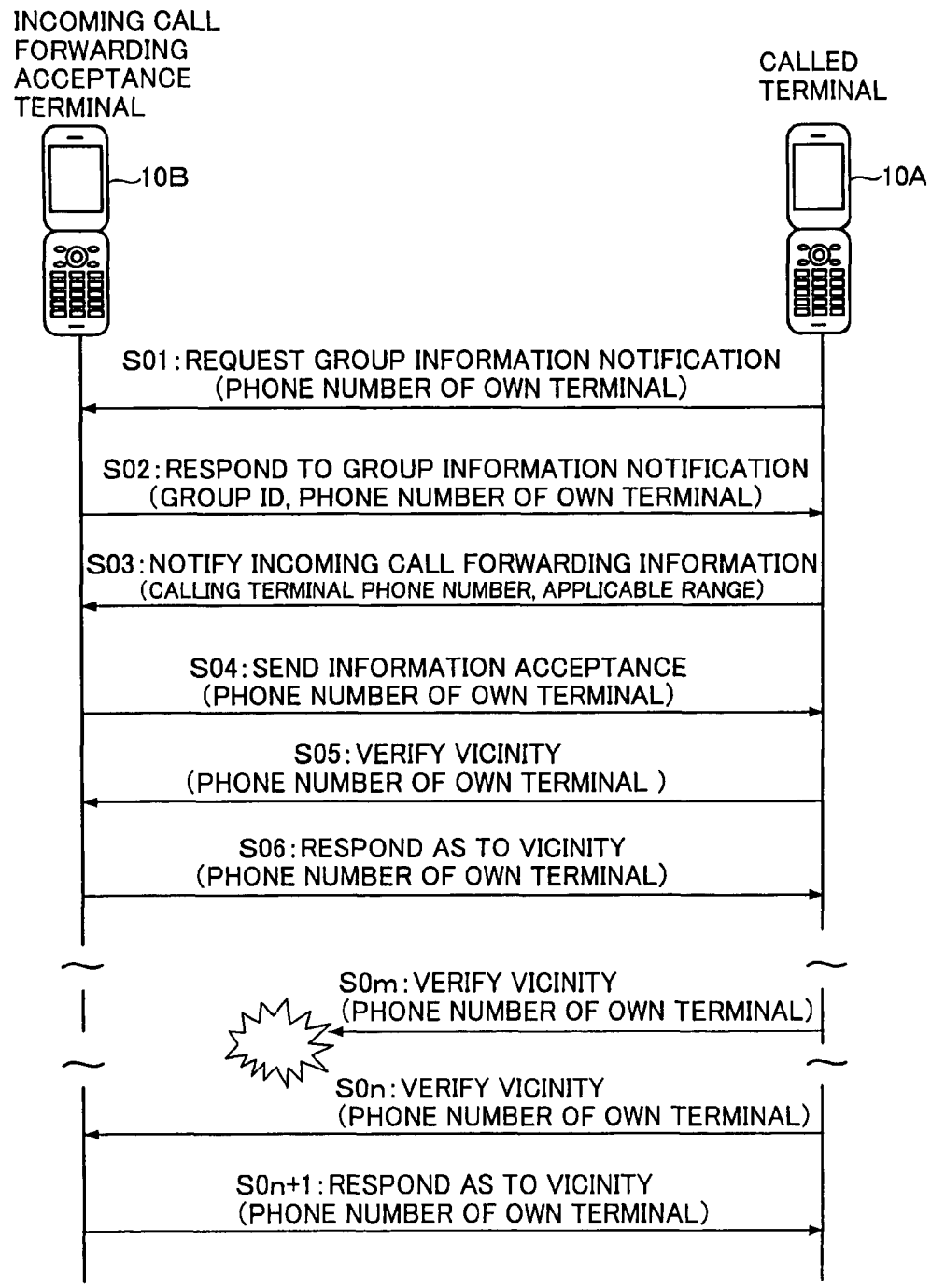
FIG. 9 is a diagram showing a sequence of wireless communication via close-range wireless communication with a called terminal and an incoming call forwarding acceptance terminal.

FIG. 9 is a diagram showing a sequence of wireless communication via close-range wireless communication between the called terminal 10A and the incoming call forwarding acceptance terminal 10B.

In this case, as shown in FIG. 2, the called terminal 10A is the communication partner terminal that the calling terminal 50 originally called, while the incoming call forwarding acceptance terminal 10B is the mobile terminal that is planned to be the incoming call forwarding destination through execution of the communication sequence described below.

In the sequence, the called terminal 10A first transmits a group information notification request that is accompanied by a notification of the terminal's (the called terminal 10A) own phone number (step S01). Upon receiving the group information notification request, in the event that the phone number of the called terminal 10A is recorded in the group information file 140A (refer to FIGS. 5 and 6) of the incoming call forwarding acceptance terminal 10B, the incoming call forwarding acceptance terminal 10B transmits the group ID of a group with which the phone number of the called terminal 10A is associated and its own (the incoming call forwarding acceptance terminal 10B) phone number to the called terminal 10A (step S02). Subsequently, at the called terminal 10A, judgment is made on whether the phone number of the incoming call forwarding acceptance terminal 10B that is transmitted therefrom is associated with a group ID in the group information file 140A (refer to FIGS. 5 and 6) of the called terminal 10A that is the same as the transmitted group ID and recorded in the group information file 140A. When the phone number of the incoming call forwarding acceptance terminal 10B that is transmitted therefrom has been associated and recorded with a group ID that is the same as the transmitted group ID that was transmitted with the phone number, if a subsequent communication state is satisfactory, the phone number of the incoming call forwarding acceptance terminal 10B will be registered with the call forwarding service center 30 (refer to FIG. 1) as a forwarding destination phone number. Accordingly, the called terminal 10A first transmits incoming call forwarding information (a calling terminal phone number and an applicable range associated with the group ID) in the incoming call forwarding information file 170A (refer to FIGS. 5 and 6), which is recorded in association with the group ID that is the same as the transmitted group ID that was transmitted from the incoming call forwarding acceptance terminal 10B (step S03). Subsequently, transmission and reception of a message confirming that the incoming call forwarding acceptance terminal 10B is in the vicinity (within a range in which close-range wireless communication is possible) are repetitively performed (steps S05, S06, . . . ).

When there are no responses even after transmitting vicinity confirmation (step S0$m$), transmission of the vicinity confirmation message will be continued for some time thereafter (step S0$n$), and in some cases, a vicinity response message may be regained (step S0$n$+1).

Close-range wireless communication between the called terminal 10A and the incoming call forwarding acceptance terminal 10B is performed as described above. When predetermined conditions such as those presented above are satisfied, the phone number of the incoming call forwarding acceptance terminal 10B is notified to the call forwarding service center 30 as the forwarding destination phone number.

Figure 10:
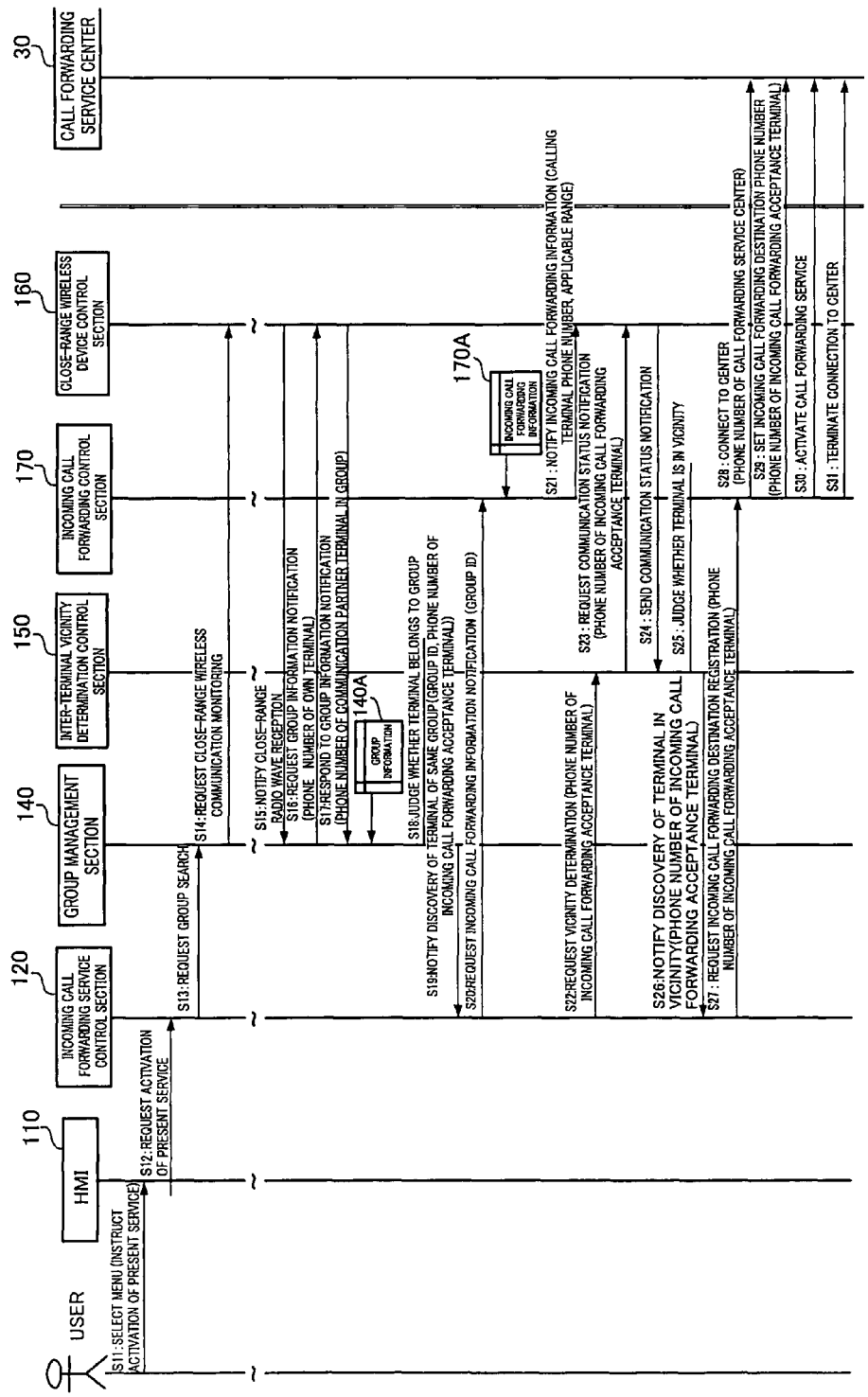
FIG. 10 is a diagram showing an internal processing sequence of a called terminal.

FIG. 10 is a diagram showing an internal processing sequence of the called terminal 10A. The processing sequence of the called terminal 10A will now be described with reference to FIG. 10 as well as FIG. 5.

It is assumed that the group information file 140A and the incoming call forwarding information file 170A shown in FIG. 5 have already been created.) Accordingly, FIG. 10 shows a sequence from a point at which an incoming call forwarding service is activated.

The user of the mobile terminal 10 (the called terminal 10A) instructs the HMI 110 through menu selection performed via key operations to activate the incoming call forwarding service (step S11). Upon receiving the instruction made via key operations, the HMI 110 requests the incoming call forwarding service control section 120 to activate the incoming call forwarding service (step S12). Upon receiving the service activation request, the incoming call forwarding service control section 120 makes a group search request to the group management section 140 (step S13). Upon receiving the group search request, the group management section 140 performs a close-range wireless communication monitoring request to the close-range wireless device control section 160 (step S14).

Upon receiving radio waves from the communication partner, the close-range wireless device control section 160 issues a close-range radio wave reception notification to the group management section 140 (step S15).

The group management section 140 next notifies the phone number of the own terminal (the called terminal 10A) to the close-range wireless device control section 160, and requests group information notification (step S16). Upon receiving the group information notification request, the close-range wireless device control section 160 notifies the phone number of the own terminal to the communication partner terminal, receives from the communication partner terminal a group ID of the own terminal (the called terminal 10A) registered in the group information file of the communication partner terminal as well as the phone number of the communication partner terminal (steps S01 and S02 in FIG. 9), and notifies the information (group ID and phone number of the communication partner terminal) to the group management section 140 as a response to the group information notification request (step S17).

In response thereto, the group management section 140 references the group information file 140A of the own terminal (the called terminal 10A) to judge whether a group ID that is the same as the notified group ID exists in the group information file 140A and also whether a phone number that is the same as the notified phone number is associated with the group ID and recorded accordingly (step S18). When the same phone number is recorded in the same group, the group management section 140 notifies the group ID and the phone number to the incoming call forwarding service control section 120 (step S19). Upon receiving the notification, the incoming call forwarding service control section 120 notifies the group ID of the current communication partner to the incoming call forwarding control section 170 and requests notification of forwarded incoming call information (step S20). Upon receiving the request, the incoming call forwarding control section 170 references the incoming call forwarding information file 170A (refer to FIGS. 5 and 7) to read out information regarding a phone number and an applicable range of a calling terminal associated to a group ID that is the same as the notified group ID from the incoming call forwarding information file 170A, and notifies incoming call forwarding information consisting of the read-out calling terminal phone number and applicable range to the close-range wireless device control section 160 (step S21). Upon receiving the notification, the close-range wireless device control section 160 notifies the incoming call forwarding information to the communication partner terminal (the incoming call forwarding acceptance terminal 10B).

Furthermore, the incoming call forwarding service control section 120 notifies the phone number of the communication partner terminal (the incoming call forwarding acceptance terminal 10B) to the inter-terminal vicinity determination control section 150, and requests determination on whether the terminal is adequate as a forwarding destination terminal and if so, determination of a period for which the terminal will be registered as a forwarding destination terminal (step S22). In response thereto, the inter-terminal vicinity determination control section 150 notifies the phone number to the close-range wireless device control section 160, and requests notification of a state of communication with the terminal (the incoming call forwarding acceptance terminal 10B) having the phone number (step S23). Upon receiving this request, the close-range wireless device control section 160 responds to the inter-terminal vicinity determination control section 150 by providing a state of communication with the incoming call forwarding acceptance terminal 10B (step S24). The inter-terminal vicinity determination control section 50 receives this response and judges whether the incoming call forwarding acceptance terminal 10B is adequate as a forwarding destination terminal and if so, calculates a period for which the terminal will be registered as a forwarding destination terminal (step S25). When the terminal is adequate as a forwarding destination terminal, the adequacy of the terminal as well as the period for which the terminal will be used as a forwarding destination terminal is notified to the incoming call forwarding service control section 120 (step S26). Upon receiving the notification, the incoming call forwarding service control section 120 notifies the phone number of the incoming call forwarding acceptance terminal 10B to the incoming call forwarding control section 170, and requests registration of the terminal having the phone number as a forwarding destination (step S27). Upon receiving the request, the incoming call forwarding control section 170 connects a communication link via the wireless communication device control section 130 (refer to FIG. 5) to the call forwarding service center 30 (step S28), and notifies the phone number of the incoming call forwarding acceptance terminal 10B to the call forwarding service center 30 to have the phone number set as an incoming call forwarding destination phone number (step S27). After requesting activation of the incoming call forwarding service (step S30), the incoming call forwarding control section 170 terminates connection to the call forwarding service center (step S31).

Furthermore, upon expiration of the period for which the incoming call forwarding acceptance terminal 10B is used as a forwarding destination terminal, the incoming call forwarding control section 170 connects a communication link to the call forwarding service center 30 to terminate the incoming call forwarding service.

Figure 11:
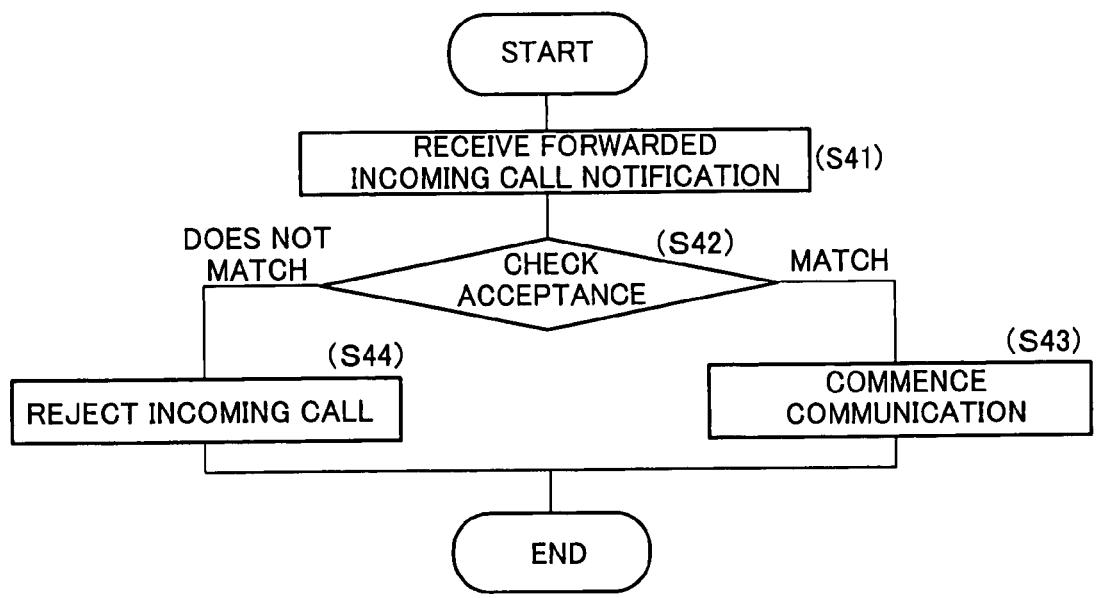
FIG. 11 is a flowchart showing processing performed when an incoming call forwarding acceptance terminal receives a forwarded incoming call notification.

FIG. 11 is a flowchart showing processing performed when the incoming call forwarding acceptance terminal 10B receives a forwarded incoming call notification.

As shown in FIG. 2, a call made to the called terminal 10A when the called terminal 10A is unable to receive the incoming call is forwarded to the incoming call forwarding acceptance terminal 10B. At this point, the incoming call forwarding acceptance terminal 10B first receives a forwarded incoming call notification that is accompanied with information on a calling terminal phone number (step S41). Subsequently, at the incoming call forwarding acceptance terminal 10B, verification is performed on whether the calling terminal phone number matches the calling terminal phone number that has been notified in advance from the called terminal 10A (in a case where the applicable range is "independent"), or on whether the calling terminal phone number matches a phone number in the same group as the group in its own (the incoming call forwarding acceptance terminal 10B) phonebook in which the calling terminal phone number that has been notified in advance is registered (in a case where the applicable range is "within phonebook group") (step S42). If the phone number matches, communication is commenced (step S43). If not, the incoming call is rejected (step S44).

As seen, by notifying in advance a calling terminal phone number to the incoming call forwarding acceptance terminal 10B, the incoming call forwarding acceptance terminal 10B will be able to reject incoming calls from calling terminals for which forwarding need not be accepted. As a result, the burden placed on the user of the incoming call forwarding acceptance terminal 10B may be reduced.

Next, a second embodiment of the present invention will be described. In the following description of the second embodiment, like elements to the respective elements of the embodiment heretofore described are indicated using like reference characters, and only what is different from the previous embodiment will be described.

Figure 12:
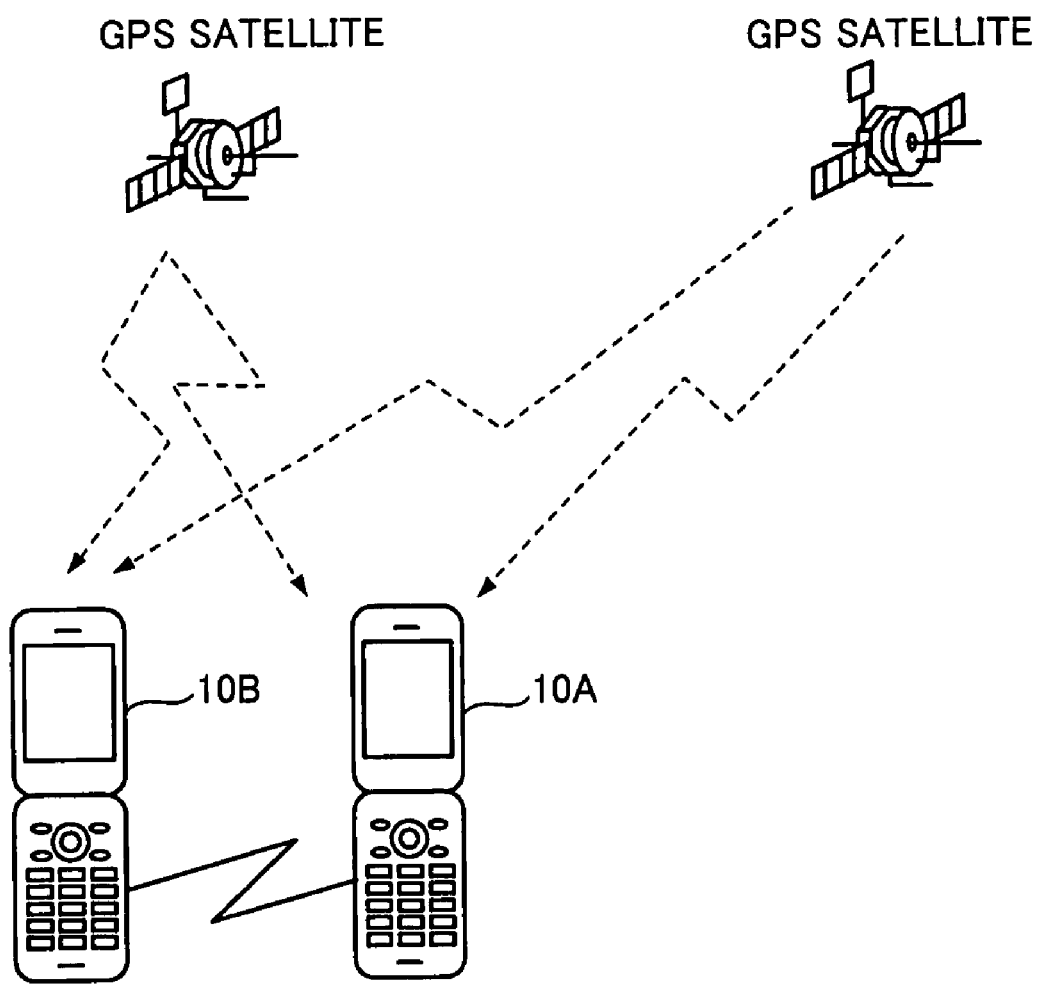
FIG. 12 is a schematic diagram showing functions of mobile terminals according to a second embodiment.
Figure 13:
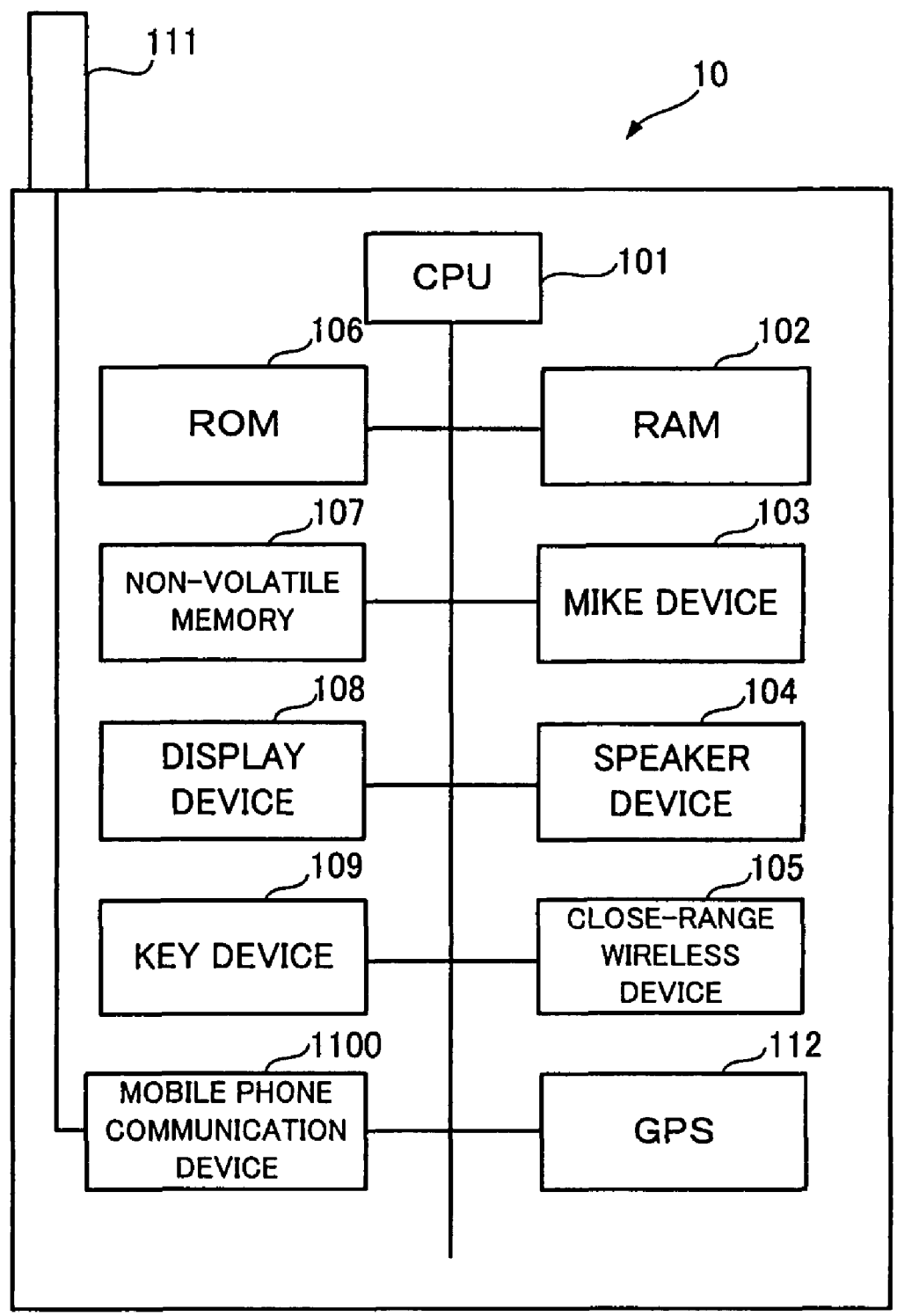
FIG. 13 is an internal configuration diagram of a mobile terminal according to the second embodiment.

FIG. 12 is a schematic diagram showing functions of mobile terminals according to the second embodiment, while FIG. 13 is an internal configuration diagram of a mobile terminal according to the second embodiment.

As shown in FIG. 12, the mobile terminals according to the second embodiment (both a called terminal 10A and an incoming call forwarding acceptance terminal 10B) are both equipped with a GPS (global positioning system) 112 (refer to FIG. 13) that receives radio waves from a GPS satellite to locate the current position of the mobile terminal.

Figure 14:
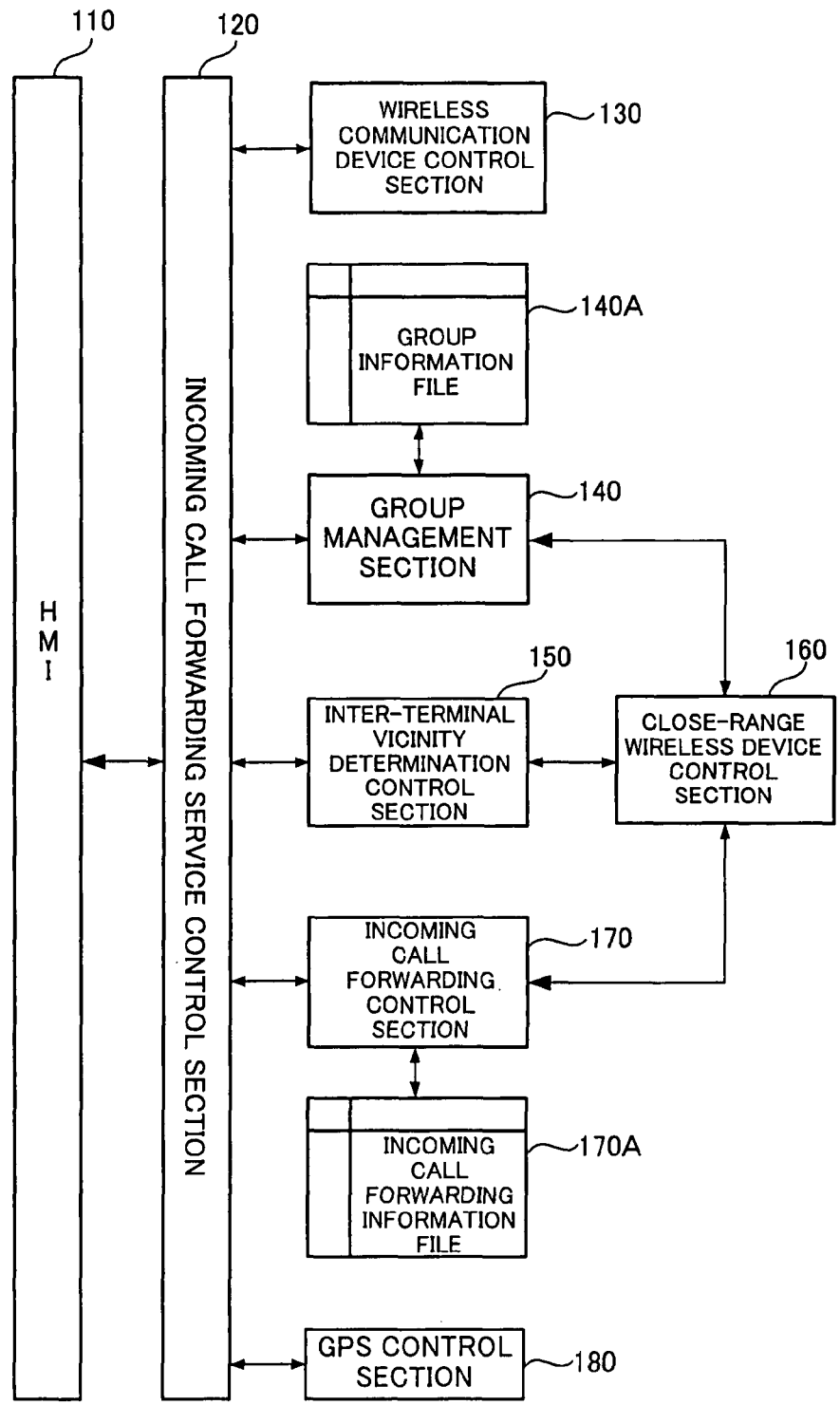
FIG. 14 is a diagram showing a structure of a forwarding program executed by a mobile terminal according the second embodiment.

FIG. 14 is a diagram showing a structure of a forwarding program executed by a CPU 101 (refer to FIG. 13) of the mobile terminal 10 according the second embodiment.

What is different from the forwarding program of the above embodiment shown in FIG. 5 is the addition of a GPS control section 180, which is responsible for controlling the GPS 112 shown in FIG. 13 to obtain positional information.

Figure 15:
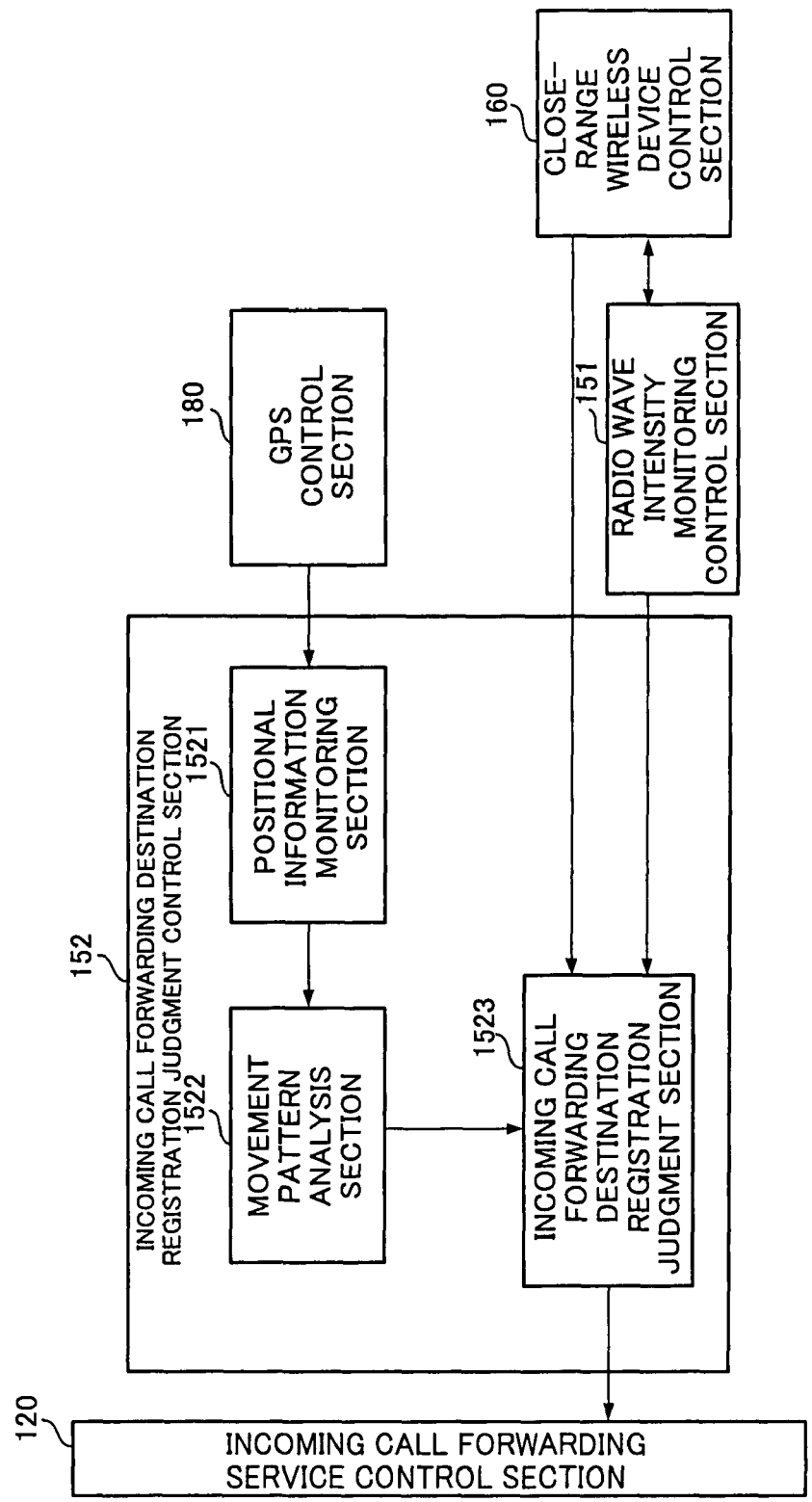
FIG. 15 is a block diagram showing a configuration of an incoming call forwarding destination registration judgment control section according to the second embodiment.

FIG. 15 is a block diagram showing a configuration of an incoming call forwarding destination registration judgment control section according to the second embodiment.

The incoming call forwarding destination registration judgment control section 152 is an element configured inside an inter-terminal vicinity determination control section 150 shown in FIG. 14, and corresponds to the element of the previously described embodiment which is shown as a single block (the inter-terminal vicinity determination control section 152) in FIG. 8.

The inter-terminal vicinity determination control section 152 is composed of a positional information monitoring section 1521, a movement pattern analysis section 1522, and an incoming call forwarding destination registration judgment section 1523. In addition, FIG. 15 also shows the GPS control section 180 (refer to FIG. 14), a radio wave intensity monitoring section 151 (refer to FIG. 8), a close-range wireless device control section 160, and an incoming call forwarding service control section 120.

The positional information monitoring section 1521 requests the GPS control section 180 for notification of positional information and receives moment-to-moment positional information, and notifies the moment-to-moment positional information to the movement pattern analysis section 1522.

The movement pattern analysis section 1522 analyzes a movement pattern of the mobile terminal 10 from moment-to-moment positional information received from the positional information monitoring section 1521, and judges whether the mobile terminal 10 is in a "stationary level" or an "in-movement level". The mobile terminal may also be in a "position immeasurable" state that is unreachable by radio waves from the GPS satellite. Information regarding whether the state of the mobile terminals is "stationary level", "in-movement level" or "position immeasurable" is notified to the incoming call forwarding destination registration judgment section 1523.

The incoming call forwarding destination registration judgment section 1523 further receives from the close-range wireless device control section 160 movement pattern information on the communication partner terminal or, in other words, information on whether the state of the communication partner terminal is "stationary level", "in-movement level" or "position immeasurable". At this stage, when close-range wireless communication with the incoming call forwarding acceptance terminal 10B is restored after an interruption, at the point of restoration, the close-range wireless device control section 160 receives notification from the incoming call forwarding acceptance terminal 10B of movement pattern information of the incoming call forwarding acceptance terminal 10B for the period during which communication was interrupted, and notifies the incoming call forwarding destination registration judgment section 1523 of the same. In a manner similar to the incoming call forwarding destination registration judgment control section 152 (refer to FIG. 8) according to the embodiment described earlier, the incoming call forwarding destination registration judgment section 1523 also receives notification on radio wave status from the radio wave intensity monitoring section 151, and judges whether the communication partner terminal is adequate as a forwarding destination terminal by comprehensively evaluating such information (movement pattern of own terminal, movement pattern of communication partner terminal, and radio wave status).

FIG. 16 is a diagram showing a correspondence between movement patterns of the own terminal and the communication partner terminal, and adequacy of the communication partner terminal as a forwarding destination terminal.

When the own terminal and the communication partner terminal are both in a "position immeasurable" state, determination is made based solely on the state of communication between the own terminal and the communication partner terminal When one of the own terminal and the communication partner terminal is in the "stationary level" and the other is in a "position immeasurable" state, the communication partner terminal becomes a registration object after consideration is given to the communication state.

When the own terminal and the communication partner terminal are both at the "stationary level", the communication partner terminal becomes a registration object even if the communication state is significantly poor.

When one of or both the own terminal and the communication partner terminal are at the "in-movement level", the communication partner terminal will not become a registration object according to the present embodiment.

As seen, by taking positional information into consideration in addition to radio wave status, adequacy of a communication partner terminal in close-range wireless communication as a forwarding destination terminal may be judged more accurately.

The invention claimed is:

1. A mobile phone capable of transmitting and receiving calls via wireless communication, which, by pre-registering a forwarding destination phone number to a call forwarding service center, receives a call forwarding service provided by the call forwarding service center in which an incoming call, made when reception thereof was impossible, is forwarded to a telephone having the registered forwarding destination phone number, the mobile phone comprising:

a wireless communication section that performs wireless communication including transmitting and receiving calls;

a close-range wireless communication section that performs close-range wireless communication with other mobile phones;

a forwarding destination storage section that stores a forwarding destination list in which numbers of one or more telephones capable of accepting forwarding are recorded;

a close-range wireless communication monitoring section that causes the close-range wireless communication section to perform close-range wireless communication and monitors establishment of close-range wireless communication with a forwarding acceptance telephone having a phone number that matches any of the phone numbers in the forwarding destination list stored in the forwarding destination storage section;

a forwarding destination notification section that causes the wireless communication section to notify the phone number of the forwarding acceptance telephone with which close-range wireless communication by the close-range wireless communication section has been established to the call forwarding service center as a forwarding destination phone number; and a forwarding destination adequacy judgment section that determines a cumulative value according to weighting by the intensity of a radio wave with a forwarding acceptance telephone with which close-range wireless communication by the close-range wireless communication section has been established, and that judges, based on the cumulative value, adequacy of the forwarding acceptance telephone as a forwarding destination, wherein the forwarding destination notification section causes, upon reception of a judgment made by the forwarding destination adequacy judgment section to the effect that the forwarding acceptance telephone with which close-range wireless communication by the close-range wireless communication section has been established is adequate as a forwarding destination, the wireless communication section to notify the phone number of the forwarding acceptance telephone to the call forwarding service center.

2. The mobile phone according to claim 1, comprising:

a calling source storage section that stores a calling source list in which phone numbers of one or more calling source telephones are recorded; and a calling source notification section that causes the close-range wireless communication section to notify a calling source phone number in the calling source list to a forwarding acceptance telephone with which close-range wireless communication by the close-range wireless communication section has been established in order to have the forwarding acceptance telephone accept forwarding of a call from a telephone having the calling source phone number.

3. The mobile phone according to claim 1, further comprising a position detection section that detects a current position, wherein the forwarding destination adequacy judgment section judges adequacy of the forwarding acceptance telephone, with which close-range wireless communication by the close-range wireless communication section has been established, as a forwarding destination based not only on the status of communication with the forwarding acceptance telephone, but also on changes in positions detected by the position detection section.

4. A non-transitory computer-readable storage medium that stores a forwarding program that is executed in a mobile phone comprising: a wireless communication section that performs wireless communication including transmitting and receiving calls; a close-range wireless communication section that performs close-range wireless communication with other mobile phones; and a processing section that executes the program, wherein by pre-registering a forwarding destination phone number to a call forwarding service center, the mobile phone receives a call forwarding service provided by the call forwarding service center in which an incoming call, made when reception thereof was impossible, is forwarded to a telephone having the registered forwarding destination phone number, the forwarding program assigning to the mobile phone a forwarding function including:

a forwarding destination storage section that stores a forwarding destination list in which phone numbers of one or more telephones capable of accepting forwarding are recorded;

a close-range wireless communication monitoring section that causes the close-range wireless communication section to perform close-range wireless communication and monitors establishment of close-range wireless communication with a forwarding acceptance telephone having a phone number that matches any of the phone numbers in the forwarding destination list stored in the forwarding destination storage section;

a forwarding destination notification section that causes the wireless communication section to notify the phone number of the forwarding acceptance telephone with which close-range wireless communication by the close-range wireless communication section has been established to the call forwarding service center as a forwarding destination phone number; and a forwarding destination adequacy judgment section that determines a cumulative value according to weighting by the intensity of a radio wave with a forwarding acceptance telephone with which close-range wireless communication by the close-range wireless communication section has been established, and that judges, based on the cumulative value, adequacy of the forwarding acceptance telephone as a forwarding destination, wherein the forwarding destination notification section causes, upon reception of a judgment made by the forwarding destination adequacy judgment section to the effect that the forwarding acceptance telephone with which close-range wireless communication by the close-range wireless communication section has been established is adequate as a forwarding destination, the wireless communication section to notify the phone number of the forwarding acceptance telephone to the call forwarding service center.

* * * * *